THRESHOLD AND LIMITING CIRCUIT WITH AUTOMATIC LEVEL CONTROL
Filed Feb. 5, 1965
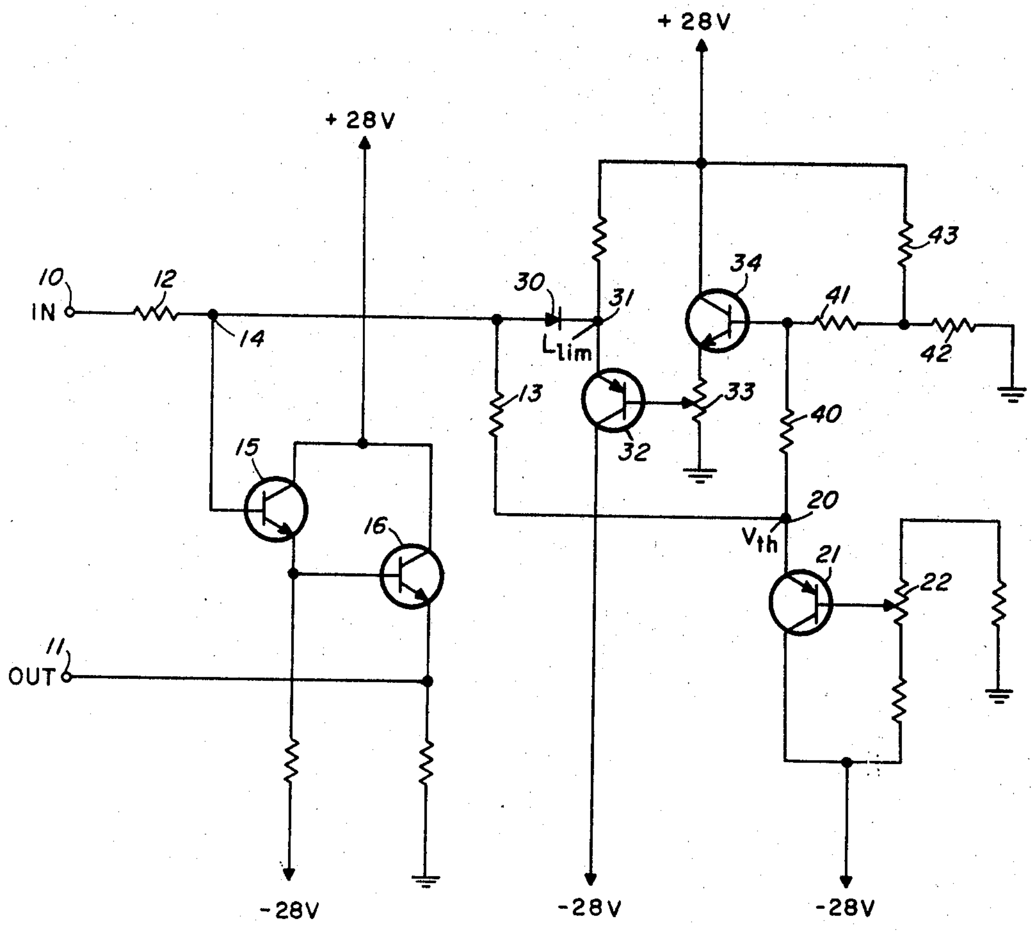
INVENTOR.
ALFRED E. POPODI
BY
[signature]
ATTORNEYS United States Patent Office 3,440,443

Patented Apr. 22, 1969

3,440,443

THRESHOLD AND LIMITING CIRCUIT WITH AUTOMATIC LEVEL CONTROL

Alfred E. Popodi, Glen Burnie, Md., assignor, by mesne assignments, to the United States of America as represented by the Secretary of the Navy Filed Feb. 5, 1965, Ser. No. 430,782

Int. Cl. H03k *5/08;* G06g *7/12;* H03b *3/02*

U.S. Cl. 307—235 2 Claims

ABSTRACT OF THE DISCLOSURE

To pass video signals above a "threshold" voltage and below a "limiting" voltage, controls of the two voltages are interconnected to keep nearly constant the ratio of the two voltages.

This invention relates to circuits for controlling the level of signals and is particularly directed to means for passing signals the amplitudes of which lie above an adjustable threshold value and below an adjustable upper limit.

The processing of such signals as radar and sonar signals often require amplitude selection such that video signal inputs below a given threshold level and above a given limiting level must be rejected. The level control device of this invention has threshold and limiting controls which are independently adjustable. The adjustment of either control will not produce an output when the video input is zero. Both level controls are calibrated in relative video amplitudes. Because the level controls are independent means are provided to prevent the setting of the threshold above the limiting level which would suppress all video input signals.

The object of this invention is to provide a signal level control with a lower threshold and an upper limiting control, the controls being so interlocked as to provide optimum operation over a wide range.

Other objects and features of this invention will become apparent to those skilled in the art by referring to the preferred embodiments described in the following specification and shown in the accompanying drawing in which the single figure is a schematic circuit diagram of one embodiment.

It is contemplated that signals will be received at input terminal 10 which are both below a threshold level and above a limiting level beyond which the output processing circuits, not shown, cannot effectively operate. That is, only signals received at input terminal 10 will be applied to output terminal 11, which are between the threshold and limiting levels. It is contemplated further that the video signals applied at the input 10 are above reference ground.

The circuit of this invention consists primarily of a resistive voltage divider comprising resistances 12 and 13. The signal applied at point 10 is taken from the mid-point 14, is amplified in amplifiers 15 and 16 and is applied to the output terminal 11. The biasing potential applied to amplifier 15 is such that a minimum positive voltage at point 14 is required to obtain a signal at the output 11.

The other end of the voltage divider 12, 13 is connected to a variable low impedance voltage source at terminal 20. The voltage $V_{th}$ at terminal 20 is established by the emitter follower 21. Voltage $V_{th}$ is adjustable from 0 to a finite negative value depending on the maximum video level at the input. The adjustable potentiometer 22 connected to the base of the transistor 21 controls the voltage $V_{th}$ at terminal 20. The voltage source across potentiometer 22 has a grounded and a negative terminal as shown.

At mid-point 14, a limiting diode 30 is connected to another low impedance voltage source at junction 31 capable of applying to the diode the positive voltage $V_{lim}$. The cathode voltage of the diode 30 is variable from reference ground to a high positive potential under the control of the base of the PNP transistor 32, the base of which is connected to the adjustable potentiometer 33 connected at its terminals between ground and the positive voltage supply.

According to an important feature of this invention, the positive value of the voltage across the limiting control potentiometer 33 is adjusted by the base of transistor 34 which, in turn, is connected to point 20 and the emitter of the threshold controlling transistor 21. Assume the threshold voltage is set to a negative value $V_{th}$, then point 14 is biased negative as is the base of transistor 15. This cuts off both transistors 15 and 16 and the video output at the emitter of transistor 16, is zero. As the input signal voltage increases positively, point 14 eventually becomes positive and transistor 16 starts to conduct, providing video output. If the input signal voltage further increases, diode 30 will eventually begin to conduct. This clamps point 14 and keeps point 14 from rising. This provides the desired limiting action.

Importantly, limiting voltage source is controlled by the threshold voltage. This is achieved by the voltage divider consisting of resistors 40, 41, 42 and 43. As $V_{th}$ becomes more negative, the base of transistor 34 becomes less positive, thereby reducing the maximum limiting control potentiometer 33 and is required only in high bandwidth applications. Both controls can now be calibrated in terms of relative amplitude values. If, for instance, both controls are set to say 50%, all video inputs smaller than 50% of the peak video will be suppressed due to the threshold action. From the residual video after thresholding only up to 50% can pass and all levels above will be suppressed due to limiting action. That is, the maximum limiting level is a function of the threshold potential and there exists a fixed relationship between the two voltages. It is apparent that if the voltage range of the limiter source were fixed, the limiting control would be only partly effective which is undesirable.

An advantage of the circuit of this invention is the assurance that the limiting control voltage cannot drop below the threshold control voltage, creating the anomalous situation where no signal can pass.

Obviously many modifications and variations of the present invention are possible in the light of the above teachings. It is therefore to be understood that within the scope of the appended claims the invention may be practiced otherwise than as specifically described.

What is claimed is:

1. The combination of a source of signals of widely varying amplitude and a level control system, said system comprising:

a potentiometer with terminals connected across said source, an amplifier with an input circuit connected to an intermediate point on said potentiometer, a threshold biasing source connected to one of said terminals to proportionately bias said intermediate point and said amplifier input, said biasing source being adjustable to determine the threshold level which must be exceeded by the signal amplitude to pass said amplifier, a limit control means comprising a diode connected between said intermediate point and a back biasing potential source, means for adjusting said back biasing potential to adjust the voltage clamping level at said amplifier input, means responsive to said threshold biasing voltage for controlling the range of said back biasing potential, said back biasing source comprising, an emitter follower with an emitter connected to said diode to back bias said diode, and an adjustable potentiometer with a transistor for controlling the current through said potentiometer, the voltage of an adjustable contact of said potentiometer being applied to the control electrode of said emitter follower.

2. The combination of a source of signals of widely varying amplitude and a level control system, said system comprising:

a potentiometer with terminals connected across said source, an amplifier with an input circuit connected to an intermediate point on said potentiometer, a threshold biasing source connected to one of said terminals to proportionately bias said intermediate point and said amplifier input, said biasing source being adjustable to determine the threshold level which must be exceeded by the signal amplitude to pass said amplifier, a limit control means comprising a diode connected between said intermediate point and a back biasing potential source, means for adjusting said back biasing potential to adjust the voltage clamping level at said amplifier input, means responsive to said threshold biasing voltage for controlling the range of said back biasing potential, said threshold biasing source comprising;

an emitter follower with an emitter connected to said one terminal, and a calibrated adjustable voltage source connected to the control electrode of said emitter follower.

References Cited

UNITED STATES PATENTS

| | | | |
|---|---|---|---|
| 2,864,904 | 12/1958 | Jensen. | |
| 2,878,398 | 3/1959 | Peterson. | |
| 2,949,543 | 8/1960 | Nordahl et al. | |
| 3,068,368 | 12/1962 | Grunnaldt. | |
| 3,070,750 | 12/1962 | Farber. | |
| 3,109,103 | 10/1963 | Wilhelmsen. | |
| 3,188,554 | 6/1965 | Reid -------------- | 307—237 |
| 3,303,425 | 2/1967 | Pendleton ---------- | 307—235 |

ARTHUR GAUSS, *Primary Examiner.*

J. D. FREW, *Assistant Examiner.*

U.S. Cl. X.R.

307—229; 328—168, 169